(12) United States Patent
Chen et al.

(10) Patent No.: US 9,450,242 B2
(45) Date of Patent: Sep. 20, 2016

(54) METHOD FOR MANUFACTURING NANOSTRUCTURED METAL OXIDE CALCINATE AND NANOSTRUCTURED METAL OXIDE CALCINATE THEREOF

(71) Applicant: NATIONAL SUN YAT-SEN UNIVERSITY, Kaohsiung (TW)

(72) Inventors: Chun-Hu Chen, Kaohsiung (TW); Cheng-Chi Kuo, Kaohsiung (TW); Wen-Jie Lan, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 232 days.

(21) Appl. No.: 14/102,650

(22) Filed: Dec. 11, 2013

(65) Prior Publication Data
US 2015/0048280 A1    Feb. 19, 2015

(30) Foreign Application Priority Data

Aug. 15, 2013   (TW) .............................. 102129330 A

(51) Int. Cl.
*H01B 1/02* (2006.01)
*H01M 4/505* (2010.01)
*C01G 1/02* (2006.01)
(Continued)

(52) U.S. Cl.
CPC ............ *H01M 4/505* (2013.01); *C01B 13/366* (2013.01); *C01F 17/0043* (2013.01); *C01G 1/02* (2013.01); *C01G 45/1228* (2013.01); *C01G 51/04* (2013.01); *C01G 51/40* (2013.01); *C01G 51/44* (2013.01); *C01P 2002/72* (2013.01);
(Continued)

(58) Field of Classification Search
CPC .................................................... B82Y 40/00
USPC ...................... 252/519.1; 423/263, 593.1
See application file for complete search history.

(56) References Cited

U.S. PATENT DOCUMENTS

3,685,965 A    8/1972  Kniprath
3,720,618 A *  3/1973  Toda ..................... B82Y 30/00
                                                    252/62.55
2014/0374358 A1* 12/2014 Lewis ..................... C02F 1/42
                                                    210/688

FOREIGN PATENT DOCUMENTS

CN       1539081 A    10/2004
CN      101237925 A    8/2008
WO    2012168957 A1   12/2012

OTHER PUBLICATIONS

Taiwanese Office Action mailed Jun. 12, 2015 for Taiwanese Patent Application No. 102129330, 7 pages.

*Primary Examiner* — Khanh Tuan Nguyen
(74) *Attorney, Agent, or Firm* — Jackson IPG PLLC; Demian K. Jackson

(57) ABSTRACT

A method for manufacturing a nanostructured metal oxide calcinate suitable for biosensor through a procedure of redox reaction is disclosed in this invention. The nanostructured metal oxide calcinate is free of impurities and produced with better electrocatalytic activity and better conductivity. Thus, an electrode of biosensor can be modified via the nanostructured metal oxide calcinate. The method for manufacturing the nanostructured metal oxide calcinate includes: disposing a first metal material and a second metal material into a reaction slot and making the first metal material and the second metal material dissolved within a solvent to form a mixture, wherein the pH value of the mixture ranges between 0 to 7, the mixture performs a redox reaction process for obtaining a metal oxide material; and eventually calcining the metal oxide material for obtaining a nanostructured metal oxide calcinate.

14 Claims, 16 Drawing Sheets

(51) Int. Cl.
*C01G 51/04* (2006.01)
*C01B 13/36* (2006.01)
*C01G 51/00* (2006.01)
*C01G 45/12* (2006.01)
*C01F 17/00* (2006.01)
*H01M 4/525* (2010.01)

(52) U.S. Cl.
CPC ........ *C01P2002/77* (2013.01); *C01P 2002/85* (2013.01); *C01P 2002/88* (2013.01); *C01P 2004/03* (2013.01); *C01P 2004/04* (2013.01); *C01P 2004/62* (2013.01); *C01P 2004/64* (2013.01); *C01P 2006/12* (2013.01); *H01M 4/525* (2013.01)

METHOD FOR MANUFACTURING NANOSTRUCTURED METAL OXIDE CALCINATE AND NANOSTRUCTURED METAL OXIDE CALCINATE THEREOF

FIELD OF THE INVENTION

The present invention generally relates to a method for manufacturing a nanostructured metal oxide calcinate, more particularly to the method for manufacturing the nanostructured metal oxide calcinate with higher electrocatalytic activity and conductivity.

BACKGROUND OF THE INVENTION

Electrode is the core of electrochemical apparatus. Conventional electrode was manufactured with a noble metal such as gold, silver, platinum, palladium or iridium. For better conductivity of mentioned noble metals, conventional electrode generally possesses higher sensitivity. However, noble metal also represents high cost, which results in higher manufacturing cost of conventional electrode. Therefore, seeking material with low cost and high conductivity to replace noble metal is a developed point in industry.

Metal Oxide, such as $RuO_2$, $MnO_2$ or $PbO_2$, may be used for producing conventional electrode. However, the conductivity of metal oxides mentioned above is still insufficient. Additionally, when mentioned metal oxides were made by method of metal organic salt thermal cleavage, costly metal alkyl salts or carboxylate must be introduced for use as precursors thus increasing the preparation costs of mentioned metal oxides. Accordingly, the costs for manufacturing conventional electrode cannot be lowered. Or, when mentioned metal oxides were made by method of sol-gel, the preparation costs may be lowered. However, products produced by sol-gel method possesses larger particles. It is necessary for grinding those particles to desired particle size. In the procedure of grinding, those particles were likely mixed with impurities so that the conductivity of mentioned metal oxides may be decreased.

In consideration of mentioned issues, a novel, general method with low-cost and simple manners for manufacturing a metal oxide material is necessarily developed to make produced metal oxide material possess higher conductivity for use in electrode material.

SUMMARY

The term "metal material" in this invention represents a solid-state metal and a metal oxide of the solid-state metal.

The primary object of the present invention is to improve the issues mentioned in background and to provide a method for manufacturing a nanostructured metal oxide calcinate that is produced with characteristic of higher conductivity.

Another object of the present invention is to provide the method for manufacturing the nanostructured metal oxide calcinate with lower manufacturing costs and higher manufacturing convenience.

The other object of the present invention is to provide the method for manufacturing the nanostructured metal oxide calcinate that is free of impurities.

To achieve the mentioned objects, the technical means and the function achieved through the technical means are described as below.

A method for manufacturing a nanostructured metal oxide calcinate includes: disposing a first metal material and a second metal material into a reaction slot to make the first metal material and the second metal material dissolved within a solvent to form a mixture, wherein the valence difference between the first metal material and the second metal material ranges between 1 to 7, the first metal material is in a metal state or in an oxidation state of metal that is not in the highest oxidation state, the second metal material is in the oxidation state of metal that is not in the metal state, the pH value of the mixture ranges between 0 to 7, the mixture performs a redox reaction to generate a metal oxide material; and calcining the metal oxide material for obtaining a nanostructured metal oxide calcinate.

In the method for manufacturing the nanostructured metal oxide calcinate, the redox reaction is performed at a temperature between 25 to 200 degrees Celsius and a pressure between 0 to 1554.9 kPa.

In the method for manufacturing the nanostructured metal oxide calcinate, the redox reaction is performed at a temperature between 60 to 150 degrees Celsius and a pressure between 19.95 to 198.6 kPa.

In the method for manufacturing the nanostructured metal oxide calcinate, the redox reaction is performed at temperature of 100 degrees Celsius and pressure of 101.4 kPa.

In the method for manufacturing the nanostructured metal oxide calcinate, the period for performing the redox reaction is in the range between 0.5 to 24 hours.

In the method for manufacturing the nanostructured metal oxide calcinate, the calcination period of the metal oxide material is in the range between 1 hour to 24 hours.

In the method for manufacturing the nanostructured metal oxide calcinate, the calcination period of the metal oxide material is 6 hours.

In the method for manufacturing the nanostructured metal oxide calcinate, the metal oxide material is calcined at a temperature between 260 to 900 degrees Celsius.

In the method for manufacturing the nanostructured metal oxide calcinate, the metal oxide material is calcined at a temperature of 500 degrees Celsius.

In the method for manufacturing the nanostructured metal oxide calcinate, the solvent is water.

In the method for manufacturing the nanostructured metal oxide calcinate, the first metal material is Cobalt (II), and the second metal material is Manganese (VII).

In the method for manufacturing the nano structured metal oxide calcinate, the nanostructured metal oxide calcinate compound represented by the following Chemical Formula 1:

$$Co_{3-X}Mn_XO_4 \qquad \text{[Chemical Formula 1]}$$

In the Chemical Formula 1, the X is ranging from 0 to 1.5.

In the method for manufacturing the nanostructured metal oxide calcinate, the first metal material is Cobalt (II), and the second metal material is Chromium (VI).

In the method for manufacturing the nanostructured metal oxide calcinate, the nanostructured metal oxide calcinate compound represented by the following Chemical Formula 2:

$$Co_{3-X}Cr_XO_4 \qquad \text{[Chemical Formula 2]}$$

In the Chemical Formula 2, the X is ranging from 0 to 1.5.

In the method for manufacturing the nanostructured metal oxide calcinate, the first metal material is Cerium (III), and the second metal material is Manganese (VII).

In the method for manufacturing the nanostructured metal oxide calcinate, the nanostructured metal oxide calcinate compound represented by the following Chemical Formula 3:

$$Ce_{1-X}Mn_XO_2 \qquad \text{[Chemical Formula 3]}$$

In the Chemical Formula 3, the X is ranging from 0 to 0.5.

The present invention provides a nanostructured metal oxide calcinate produced by procedures of redox reaction and calcination via a first metal material and a second metal material, wherein the valence difference between the first metal material and the second metal material ranges between 1 to 7, the first metal material is in a metal state or in an oxidation state of metal that is not in the highest oxidation state, the second metal material is in the oxidation state of metal that is not in the metal state, the first metal material and the second metal material are mixed with a solvent to form a mixture prior to performing the procedure of redox reaction, the pH value of the mixture ranges between 0 to 7, wherein the mixture is converted into a metal oxide material after performing the procedure of redox reaction, and the metal oxide material is converted into the nanostructured metal oxide calcinate after calcining the metal oxide material.

In the nano structured metal oxide calcinate of the present invention, the solvent is water.

In the nano structured metal oxide calcinate of the present invention, the first metal material is Cobalt (II), and the second metal material is Manganese (VII).

In the nanostructured metal oxide calcinate of the present invention, the nanostructured metal oxide calcinate compound represented by the following Chemical Formula 1:

$$Co_{3-x}Mn_xO_4 \qquad \text{[Chemical Formula 1]}$$

In the Chemical Formula 1, the X is ranging from 0 to 1.5.

In the nanostructured metal oxide calcinate of the present invention, the first metal material is Cobalt (II), and the second metal material is Chromium (VI).

In the nanostructured metal oxide calcinate of the present invention, the nanostructured metal oxide calcinate compound represented by the following Chemical Formula 2:

$$Co_{3-x}Cr_xO_4 \qquad \text{[Chemical Formula 2]}$$

In the Chemical Formula 2, the X is ranging from 0 to 1.5.

In the nanostructured metal oxide calcinate of the present invention, the first metal material is Cerium (III), and the second metal material is Manganese (VII).

In the nanostructured metal oxide calcinate of the present invention, the nanostructured metal oxide calcinate compound represented by the following Chemical Formula 3:

$$Ce_{1-x}Mn_xO_2 \qquad \text{[Chemical Formula 3]}$$

In the Chemical Formula 3, the X is ranging from 0 to 0.5.

In conclusion, the nanostructured metal oxide calcinate that is free of impurity can be produced via the manufacturing method of the present invention. Besides, the unique nanostructures of the nanostructured metal oxide calcinate increase the contact surface of the nanostructured metal oxide calcinate, so that the nanostructured metal oxide calcinate possesses higher electrocatalytic activity and sensitivity of conductivity. Furthermore, the present invention lowers the costs for manufacturing the metal oxide material, raises the manufacturing convenience and decreases environmental pollution.

Besides, the invention utilizes the nanostructured metal oxide calcinate to replace noble metal for use of electrode of traditional biosensor so as to save costs from purchasing noble metal. The sensitivity of hydrogen peroxide can be raised via high electrocatalytic activity and conductivity of the nanostructured metal oxide calcinate.

DETAILED DESCRIPTION OF THE INVENTION

Figure 1:
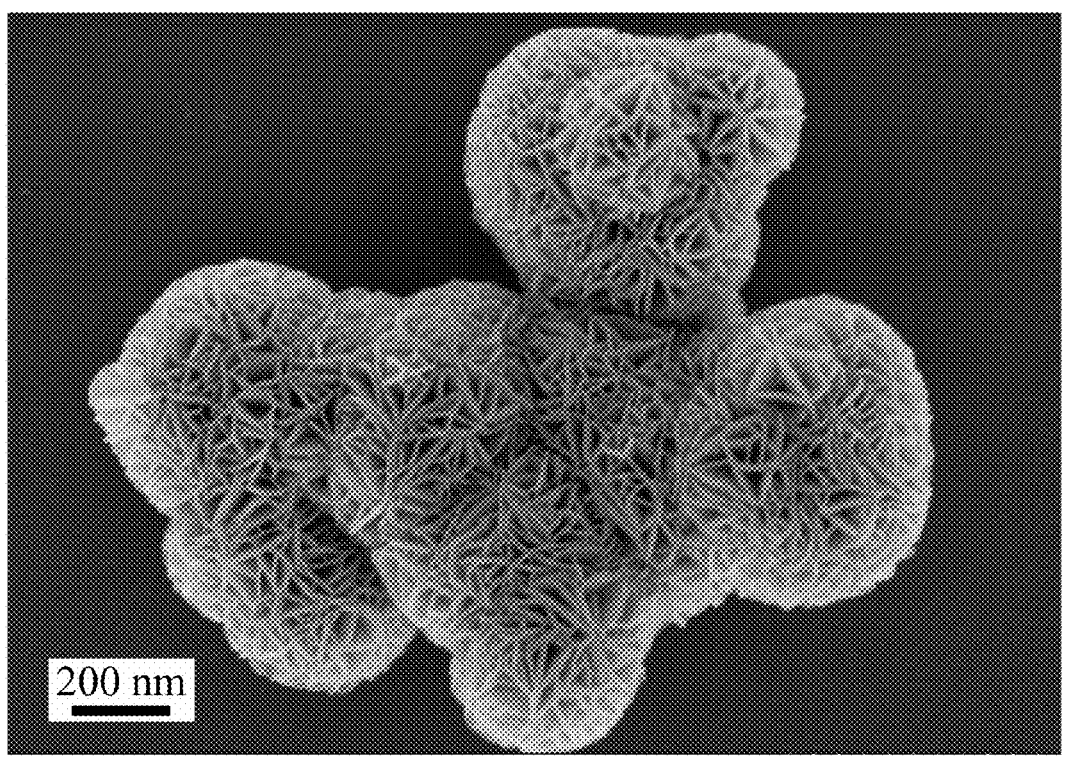
FIG. 1 is the outline of a CMOH (Cobalt Manganese Oxide Hydroxide) photographed by a scanning electron microscopy in accordance with the first preferred embodiment of the present invention.

A method for manufacturing a nanostructured metal oxide calcinate of the present invention includes a first metal material, a second metal material and a solvent for making the first metal material and the second metal material dissolved within the solvent to form a mixture, wherein the mixture is converted into a material oxide material after performing a procedure of redox reaction, and the metal oxide material is converted into a nanostructured metal oxide calcinate after performing the procedure of calcination.

The valence difference between the first metal material and the second metal material ranges between 1 to 7, the first metal material is utilized for offering electrons, and the second metal material is utilized for accepting electrons. Preferably, the first metal material is in a metal state or in an oxidation state of metal that is not in the highest oxidation state, and the second metal material is in the oxidation state of metal that is not in the metal state. Therefore, when the first metal material is mixed with the second metal material, the pH value of the mixture ranges between 0 to 7. Through valence electron transfer of metal valence electrons between the first metal material and the second metal material, the second metal material enables to embed into the lattice of the first metal material in the process of redox reaction so that the metal oxide material that is free of impurities can be generated. Preferably, dispensing a reaction temperature and a reaction pressure to accelerate the performance of the redox reaction so as to generate the mass stable metal oxide material in a short time. The reaction pressure can be appropriately adjusted depend upon the level of the reaction temperature. The table of hydrothermal temperature vs. reaction pressure is listed in table I. In this embodiment, the reaction temperature ranges between 25 to 200 degrees Celsius, and the reaction pressure ranges between 0 to 1554.9 kPa. Preferably, the reaction temperature ranges between 60 to 150 degrees Celsius, and the reaction pressure ranges between 19.95 to 198.6 kPa. Particularly, the reaction temperature is 100 degrees Celsius, and the reaction pressure is 101.4 kPa.

TABLE I

| reaction temperature (Celsius) | reaction pressure (kPa) |
|---|---|
| 60 | 19.95 |
| 80 | 47.41 |
| 100 | 101.4 |
| 150 | 198.6 |
| 180 | 1002.8 |
| 200 | 1554.9 |

Next, the metal oxide material is performed with the calcination process for obtaining a nanostructured metal oxide calcinate. Accordingly, the metal oxide material is calcined at a calcination period between 1 hour to 24 hours under a temperature between 260 to 900 degrees Celsius, preferably under a temperature of 500 degrees Celsius, making the metal oxide material transformed into a crystal phase therefore obtaining the nanostructured metal oxide calcinate. The transformation of the crystal phase makes the nanostructured metal oxide calcinate possess a relatively larger surface area.

For example, in the first preferred embodiment of the present invention, the first metal material is selected from Cobalt (II), particularly, the first metal material is cobalt sulfate ($CoSO_4 \cdot 7H_2O$). The second metal material is selected from manganese (VII), particularly, the second metal material is potassium permanganate ($KMnO_4$). The solvent is water. In this embodiment, a cobalt manganese oxide hydroxide is obtained by the following procedures: mixing 8.08 mmol of $CoSO_4 \cdot 7H_2O$, 2.69 mmol of $KMnO_4$ and 71 ml of water disposed within a reaction slot, adjusting the pH value of the mixture to 1; making the temperature of the reaction slot raised continuously from room temperature to 200 degrees Celsius; adjusting the reaction pressure to 1554.9 kPa; making the period of the reaction continuously performed for a range between 8 to 24 hours. In the process of redox reaction, a phenomenon of structural substitution is occurred via $CoSO_4 \cdot 7H_2O$ and $KMnO_4$ for obtaining the Cobalt Manganese Oxide Hydroxide (CMOH). Please refer to chemical equation 1 as followed:

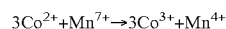

$$3Co^{2+}+Mn^{7+} \rightarrow 3Co^{3+}+Mn^{4+}$$

Figure 2:
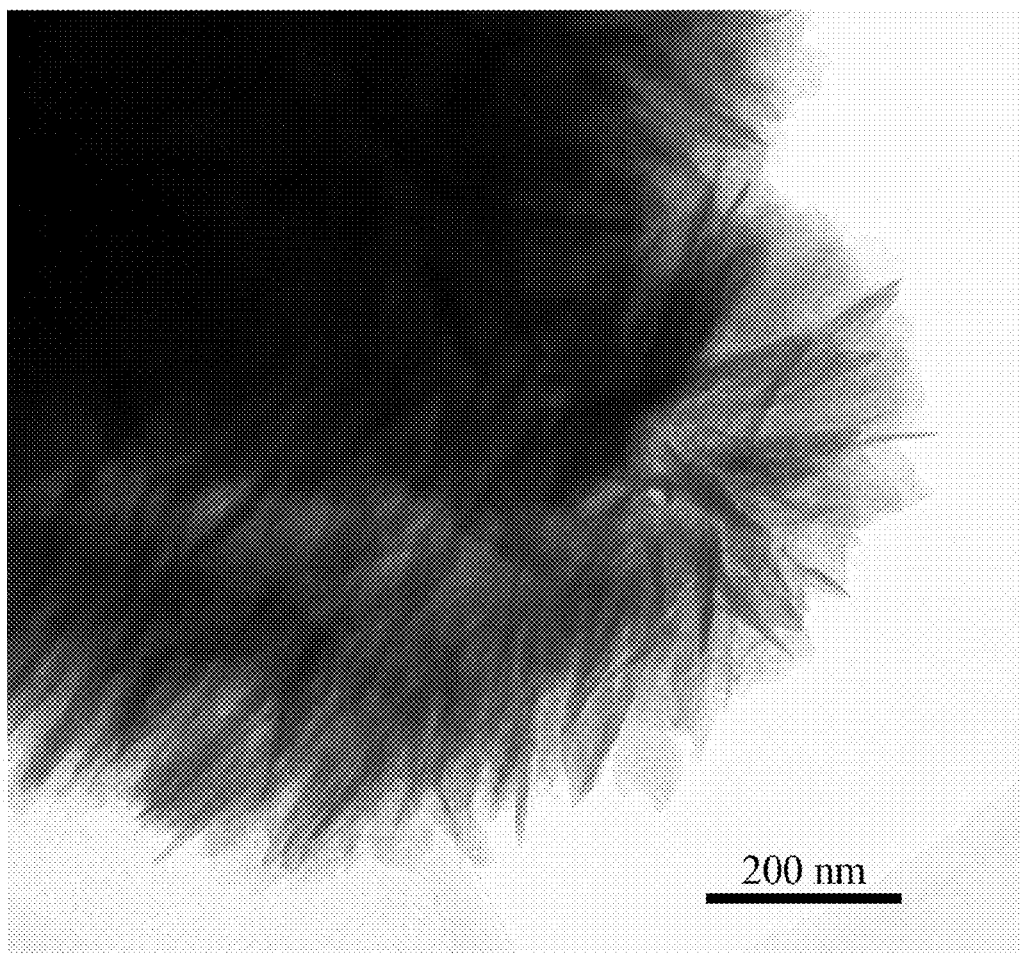
FIG. 2 is the interior structure of the CMOH photographed by a transmission electron microscopy in accordance with the first preferred embodiment of the present invention.
Figure 3:
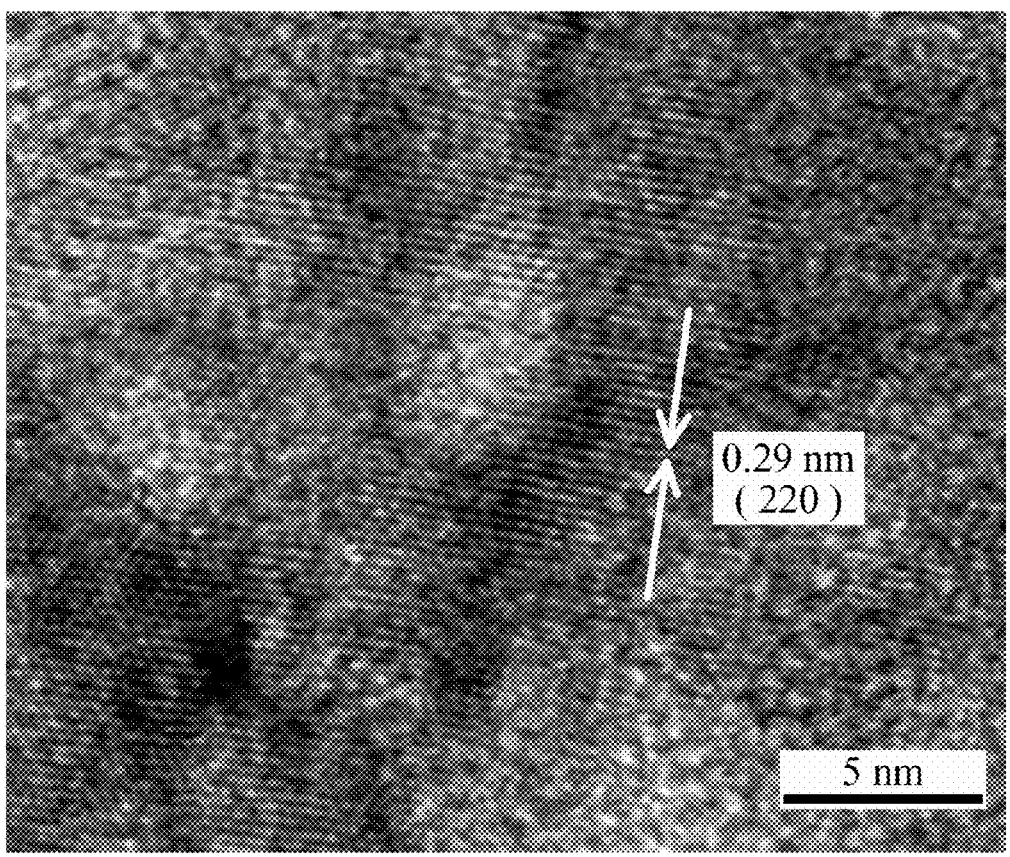
FIG. 3 is the lattice spacing of the CMOH in accordance with the first preferred embodiment of the present invention.
Figure 4:
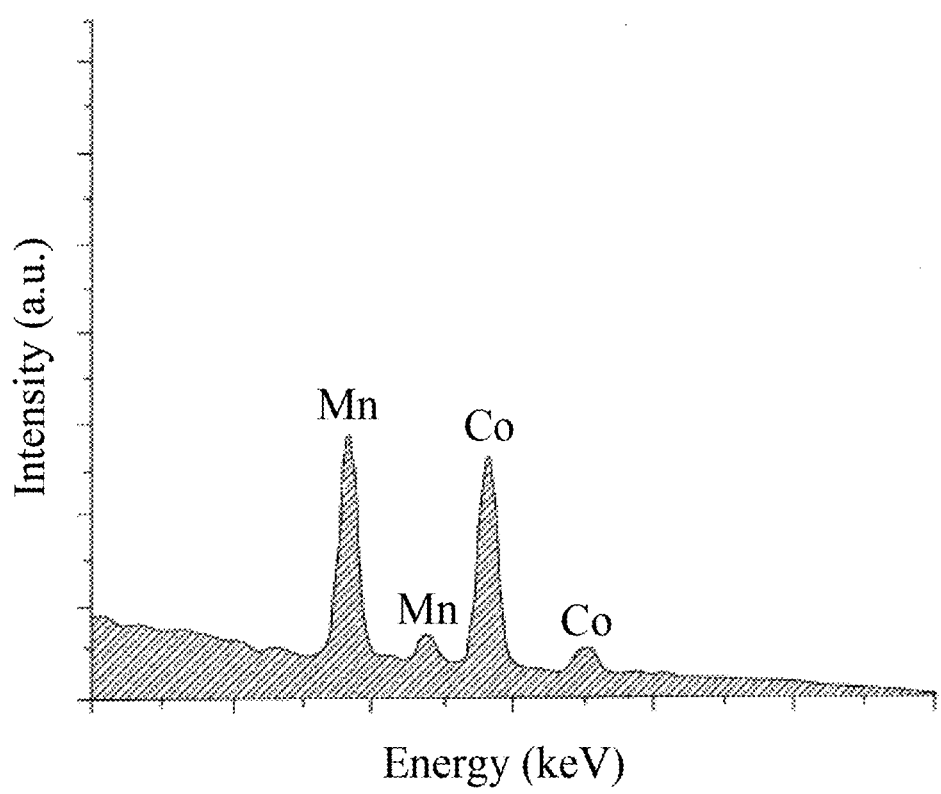
FIG. 4 is the energy dispersive X-ray analysis of the CMOH in accordance with the first preferred embodiment of the present invention.

FIG. 1 is the outline of the CMOH photographed by a scanning electron microscope. From observation of FIG. 1, the CMOH possesses a three-stage structure, the structure of the first stage is a layer-shaped crystalline, the structure of the second stage is a three-dimensional flower-like nanostructure, the structure of the third stage is in spherical shaped, wherein the thickness of the slice shape in the flower-like nanostructure ranges between 5 to 10 nm, and the diameter of the third stage ranges between 500 to 1000 nm. Please refer to FIGS. 2 and 3, mentioned Figs are the outlines of the CMOH observed by transmission electron microscopy under different scales. FIG. 2 indicates that the three-stage structure of the CMOH in this embodiment is quite compact rather than hollow. FIG. 3 indicates that the lattice spacing of the CMOH is approximately 0.29 nm, which shows no additional crystal phase or impurity. Therefore, it is verified that the product produced by the redox reaction of the present invention enables to obtain the CMOH that is free of impurities without an additional procedure of purification. FIG. 4 is the energy dispersive X-ray spectrum analysis of the CMOH, it is verified that the metal oxide material is composed of cobalt and manganese.

After that, the CMOH is processed to form a spinel phase the calcination. Accordingly, after performing the calcination process, the CMOH is converted into a cobalt manganese oxide calcinate, and the CMOH is in the spinel phase, wherein the cobalt manganese oxide calcinate compound represented by the following Chemical Formula 1:

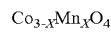

$$Co_{3-X}Mn_XO_4 \quad \text{[Chemical Formula 1]}$$

Figure 5:
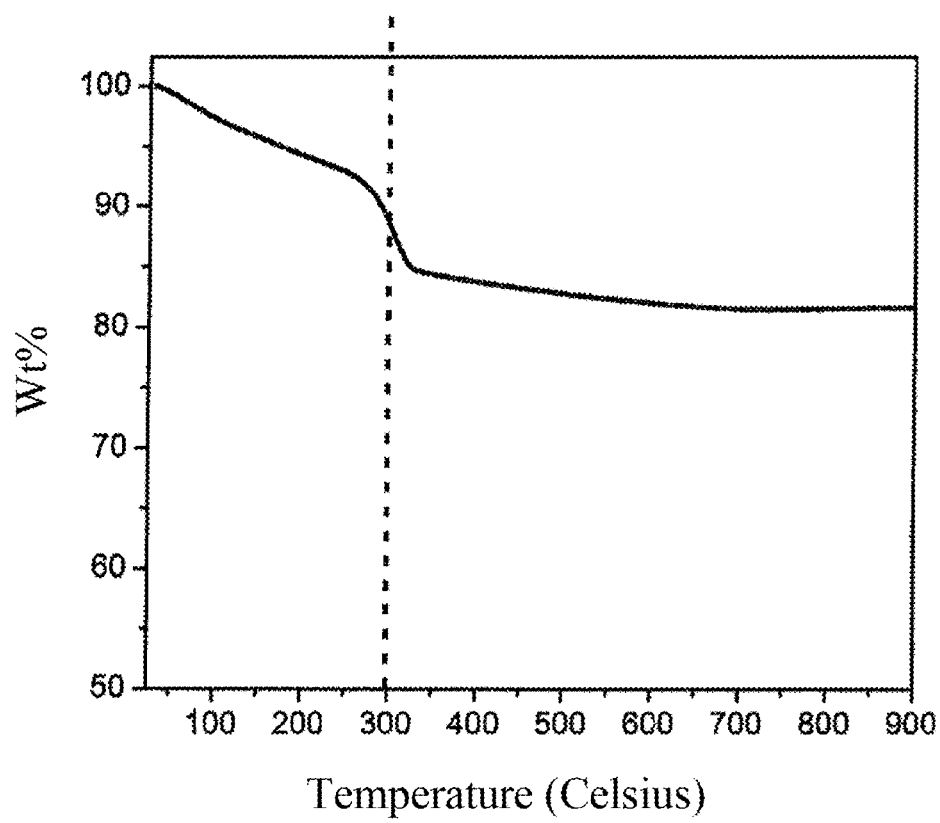
FIG. 5 is the thermogravimetric analysis of the CMOH in accordance with the first preferred embodiment of the present invention.
Figure 6:
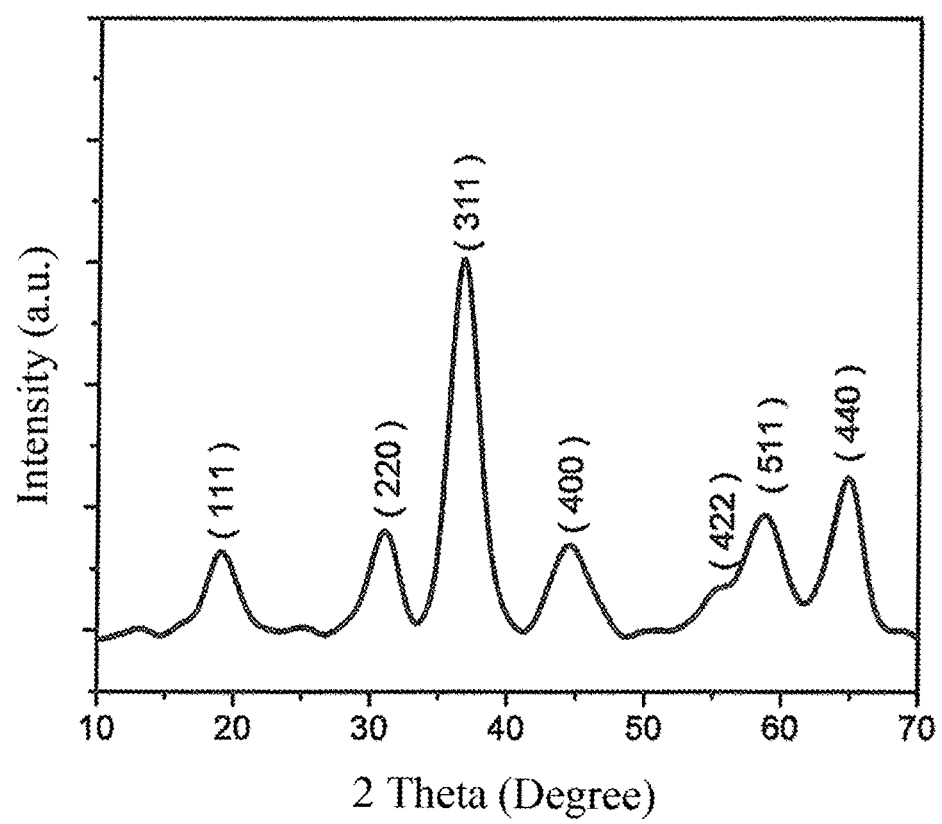
FIG. 6 is the X-ray powder diffraction of the CMOH calcined for 1 hour in accordance with the first preferred embodiment of the present invention.
Figure 7:
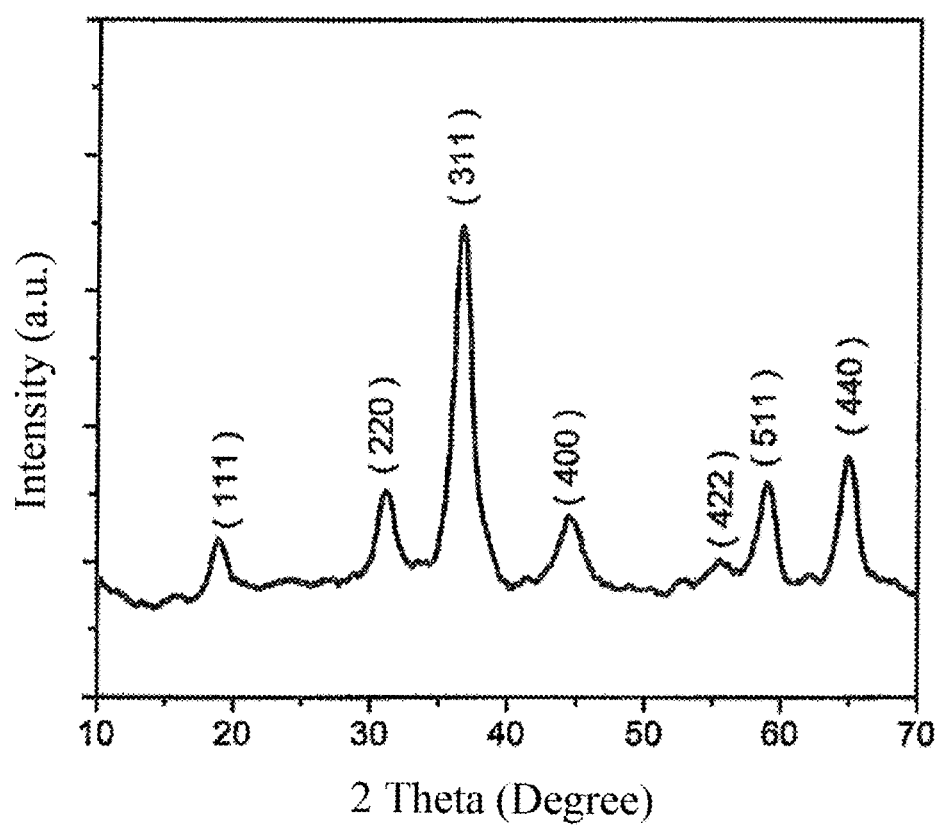
FIG. 7 is the X-ray powder diffraction of CMOH calcined for 24 hours in accordance with the first preferred embodiment of the present invention.
Figure 8:
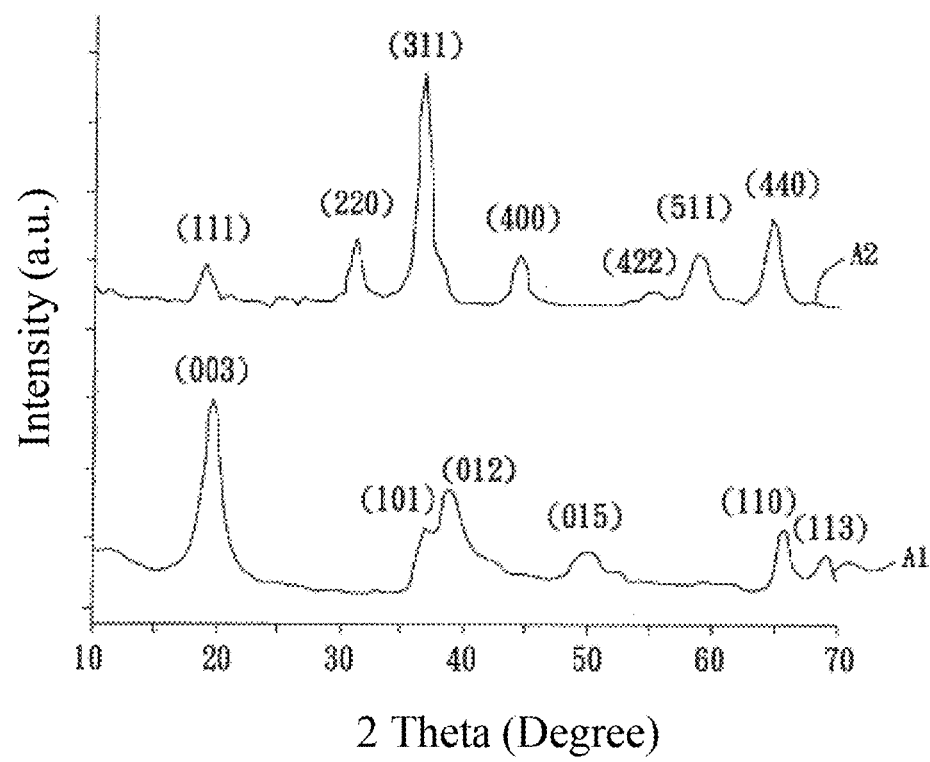
FIG. 8 is the X-ray powder diffraction of the CMOH before/after calcination in accordance with the first preferred embodiment of the present invention.

In the Chemical Formula 1, the X is ranging from 0 to 1.5. FIG. 5 is the thermogravimetric analysis of the CMOH, this figure indicates that the polymorph of the CMOH is converted into the spinel phase when the temperature is at 260 degrees Celsius under temperature between 260 to 900 degrees Celsius, and the CMOH possesses high thermostability of at least more than 900 degrees Celsius. FIG. 6 is the X-ray powder diffraction analysis of the CMOH calcined for 1 hour, and FIG. 7 is the X-ray powder diffraction analysis of the CMOH calcined for 24 hours. The results of FIGS. 6 and 7 both indicate the CMOH is converted into the Cobalt Manganese oxide calcinate after verification by comparing with crystal databank. Preferably, when the CMOH is calcined for 6 hours at a temperature of 500 degrees Celsius, the CMOH is converted into the cobalt manganese oxide calcinate, and the cobalt manganese oxide calcinate is in the spinel phase as illustrated in FIG. 8. FIG. 8 is the X-ray power diffraction analysis, wherein A1 represents the CMOH before calcination, and A2 represents the cobalt manganese oxide calcinate after calcination. It is verified by comparing FIG. 8 with crystal databank, A2 has converted into the cobalt manganese oxide calcinate. With reference to table II, the cobalt manganese oxide calcinate of the present invention possesses relatively higher surface area.

TABLE II

| Sample (Co:Mn) | surface area (m²/g) | increasing percentage of surface area (%) |
|---|---|---|
| CMOH (4:1) | 41.5 | — |
| CMO (4:1) | 57.77 | 39 |
| CMOH (3:1) | 38.71 | — |
| CMO (3:1) | 53.34 | 38 |

The formula for calculating the increasing percentage of surface area is $$[(SA_{CMO}-SA_{CMOH})/SA_{CMOH}]\times 100\%.$$

Therefore, the cobalt manganese oxide calcinate in this preferred embodiment can be used for modified electrode of biosensor for raising conductivity via increased surface area.

Preferably, this invention adopts 0.001 g of the cobalt manganese oxide calcinate dissolved within 1 ml of an ethanol, mixing the cobalt manganese oxide with the ethanol for obtaining a cobalt manganese oxide calcinate solvent, adopting 10 ml of the cobalt manganese oxide calcinate solvent to spread on an electrode surface, drying for 10 minutes, and adopting a proton exchange membrane to spread on the electrode surface for obtaining a modifying electrode. Preferably, the proton exchange membrane is 10 ml of poly-aniline (e.g. Nafion).

Figure 9:
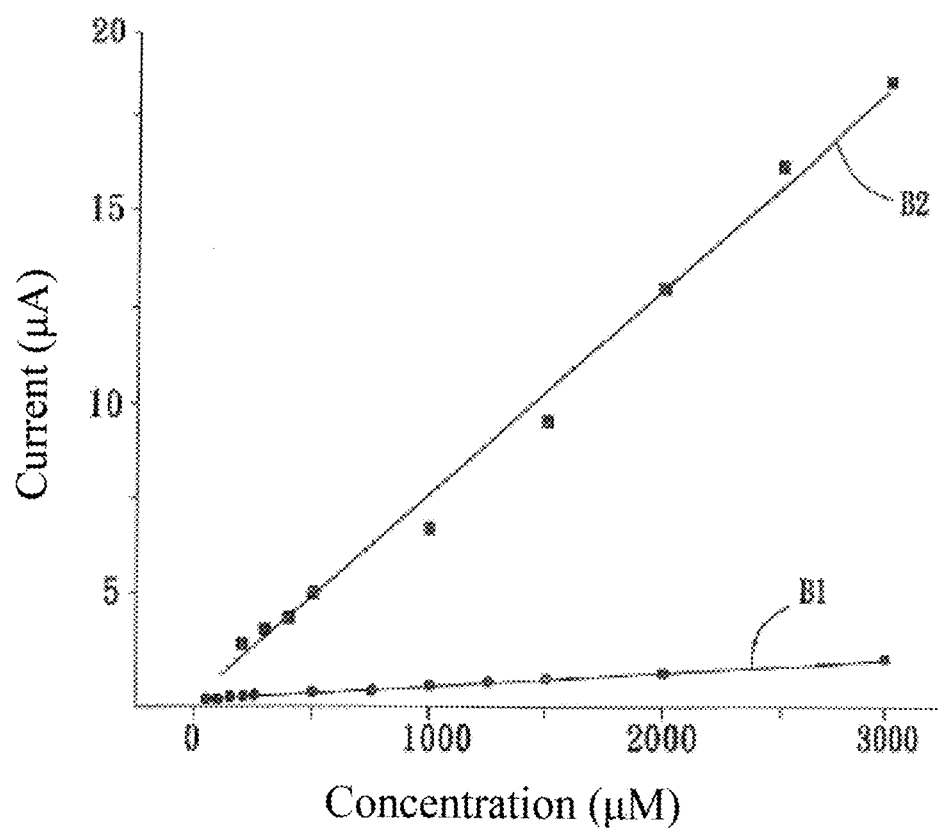
FIG. 9 is the sensitivity diagram from comparison between an electrode manufactured by a Cobalt Manganese oxide calcinate and an electrode manufactured by conventional $Co_3O_4$ through the measurement of amperometric reactor in accordance with the first preferred embodiment of the present invention.
Figure 10:
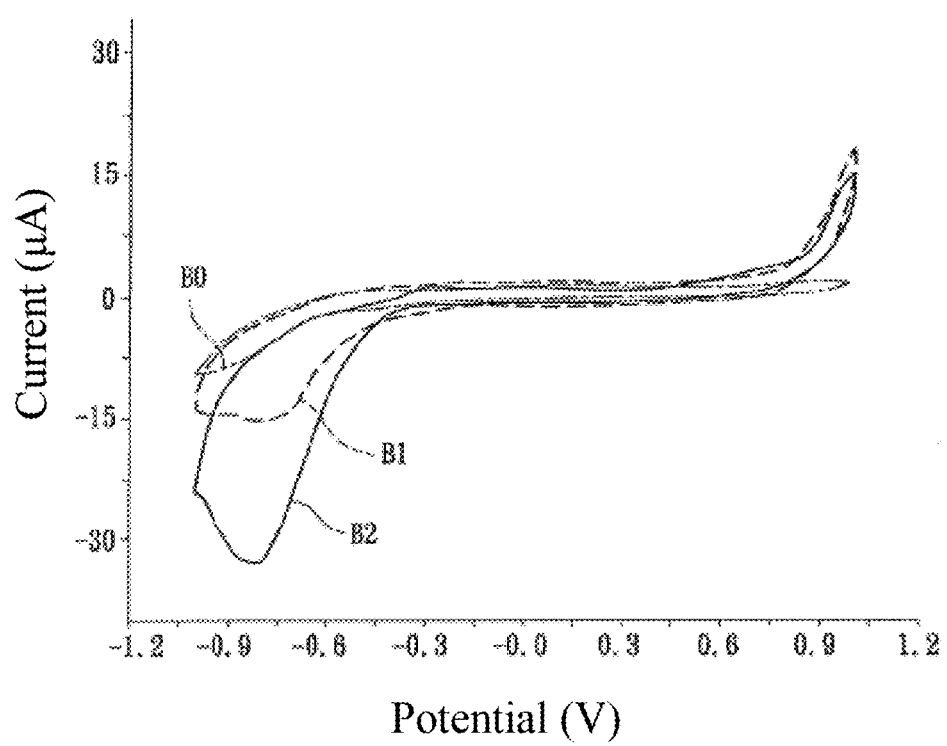
FIG. 10 is the sensitivity diagram from comparison between the electrode manufactured by the Cobalt Manganese oxide calcinate and the electrode manufactured by conventional $Co_3O_4$ through the measurement of cyclic voltammetry test in accordance with the first preferred embodiment of the present invention.

In order to verify that the modifying electrode modified by the cobalt manganese oxide calcinate of the preferred embodiment possesses better detecting sensitivity particularly for hydrogen peroxide ($H_2O_2$), we did a test through amperometric reactor to demonstrate the relationship between voltage and current in different electrodes under existence of 1 mM of hydrogen peroxide as illustrated in FIG. 9, wherein B1 represents conventional electrode modified by $Co_3O_4$, and B2 represents the electrode modified by the cobalt manganese oxide calcinate of the first preferred embodiment. FIG. 9 illustrates the sensitivity to hydrogen peroxide for the electrodes modified by different materials, the larger the slope, the better the sensitivity. FIG. 9 indicates that reduction current of hydrogen peroxide of the electrode modified by the cobalt manganese oxide calcinate of the embodiment is increased substantially comparing with the electrode modified by $Co_3O_4$. The slope of the electrode in the preferred embodiment is ten times larger than conventional electrode. It is verified that the cobalt manganese oxide calcinate possesses high electrochemical activity (high conductivity and unique nanostructures) so as to achieve the improved function for detecting hydrogen peroxide. With reference to FIG. 10, this figure is the reduction current diagram from comparison between different electrodes under existence of 1 mM of hydrogen peroxide through cyclic voltammetry test, wherein B0 represents the electrode before modification, B1 represents the electrode modified by $Co_3O_4$, and B2 represents the electrode modified by the cobalt manganese oxide calcinate of the embodiment. The results indicate the intensity of reduction current of hydrogen peroxide from the electrode (B2) modified by the cobalt manganese oxide calcinate increases substantially comparing with B0 and B1. It is verified that the cobalt manganese oxide calcinate possesses high electrochemical activity (high conductivity and unique nanostructures) and is able to use in detecting reduction signal of hydrogen peroxide ($H_2O_2$).

Figure 11:
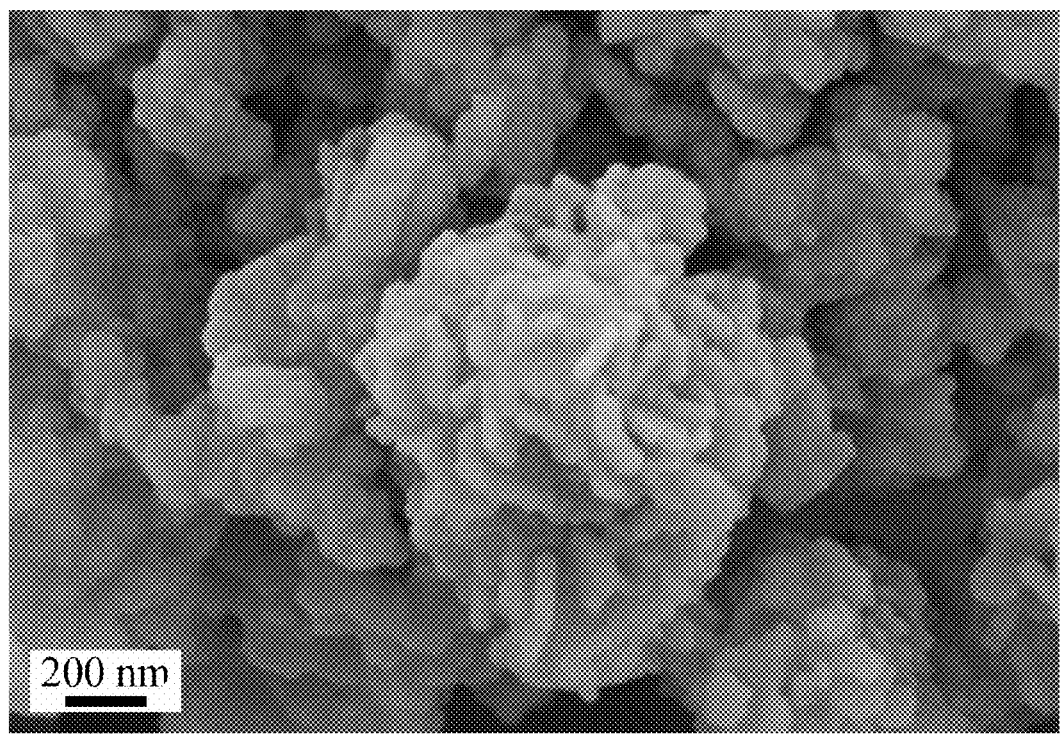
FIG. 11 is the outline of cobalt chromium oxide photographed by the scanning electron microscopy in accordance with the second preferred embodiment of the present invention.
Figure 12:
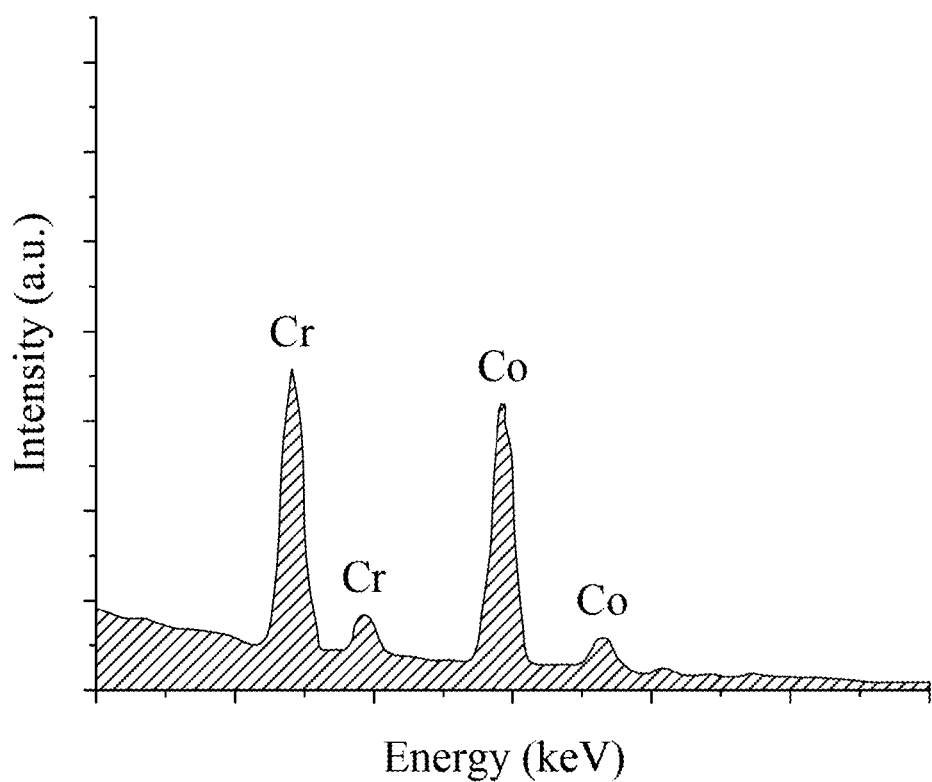
FIG. 12 is the energy dispersive X-ray analysis of cobalt chromium oxide in accordance with the second preferred embodiment of the present invention.

Besides, the method for manufacturing the nanostructured metal oxide calcinate also enables to select other metal materials to be the first metal material and the second metal material. In a second embodiment of the present invention, a metal material contained with $CrO_4$ is utilized to be the second metal material. Comparing with the first embodiment, $Mn^{7+}$ of $MnO_4^{2-}$ being contained in potassium permanganate is replaced by $Cr^{6+}$ of $CrO_4$. After redox reaction, a cobalt chromium oxide is obtained. The cobalt chromium oxide of the embodiment is in spherical shaped and accompanies with slice-shaped nano particles as illustrated in FIG. 11. With reference to FIG. 12, this figure indicates that the cobalt chromium oxide of the second embodiment is analyzed by X-ray spectral energy distribution. The result shows the metal oxide material is composed of cobalt and chromium.

Next, the cobalt chromium oxide is processed via calcination to form a spinel phase. After the calcination process, the cobalt chromium oxide is converted into a cobalt chromium oxide calcinate, and the cobalt chromium oxide calcinate is in the spinel phase, wherein the cobalt chromium oxide calcinate compound represented by the following Chemical Formula 2:

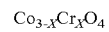  [Chemical Formula 2]

Figure 13:
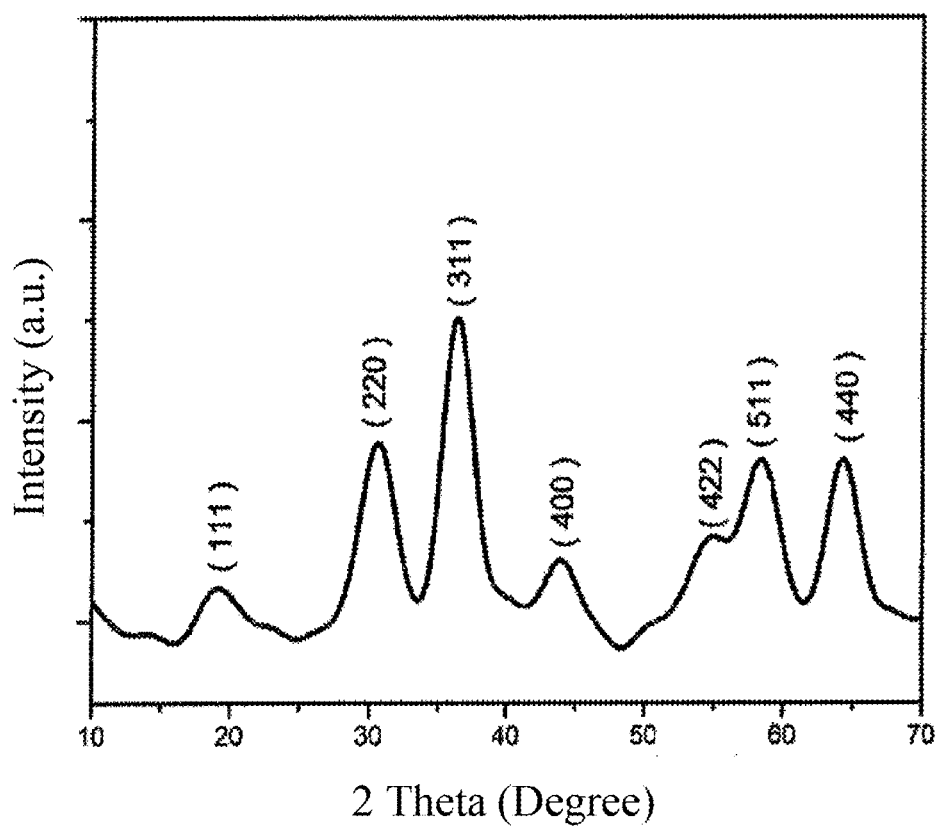
FIG. 13 is the X-ray powder diffraction of cobalt chromium oxide calcined for 1 hour in accordance with the second preferred embodiment of the present invention.
Figure 14:
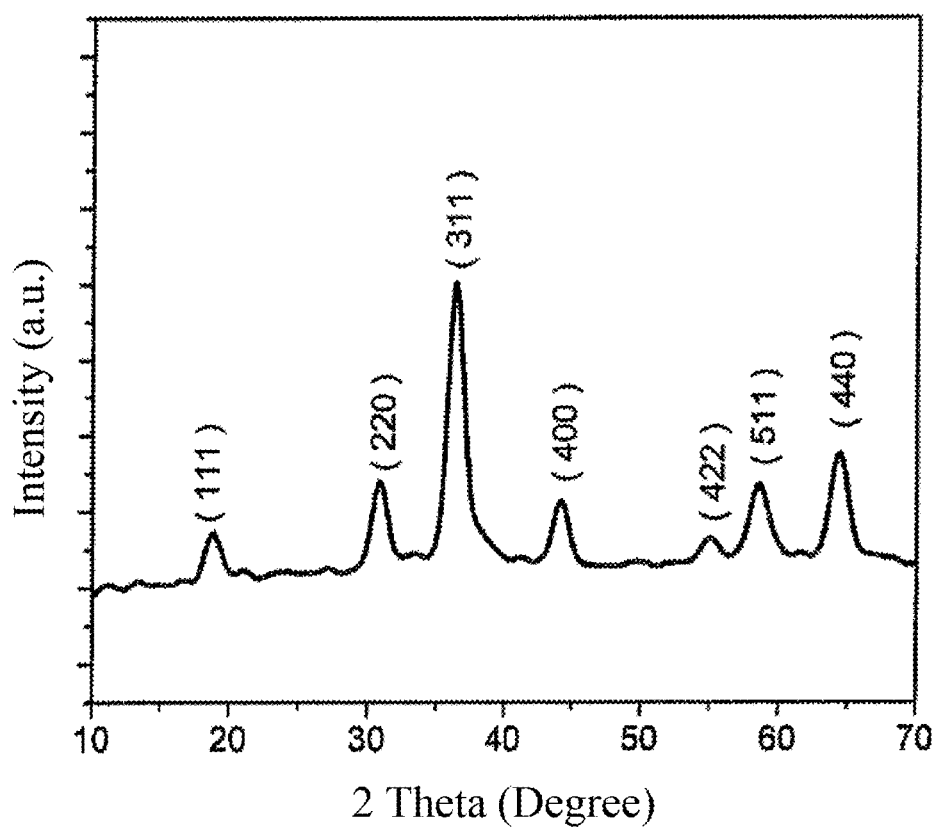
FIG. 14 is the X-ray powder diffraction of cobalt chromium oxide calcined for 24 hours in accordance with the second preferred embodiment of the present invention.
Figure 15:
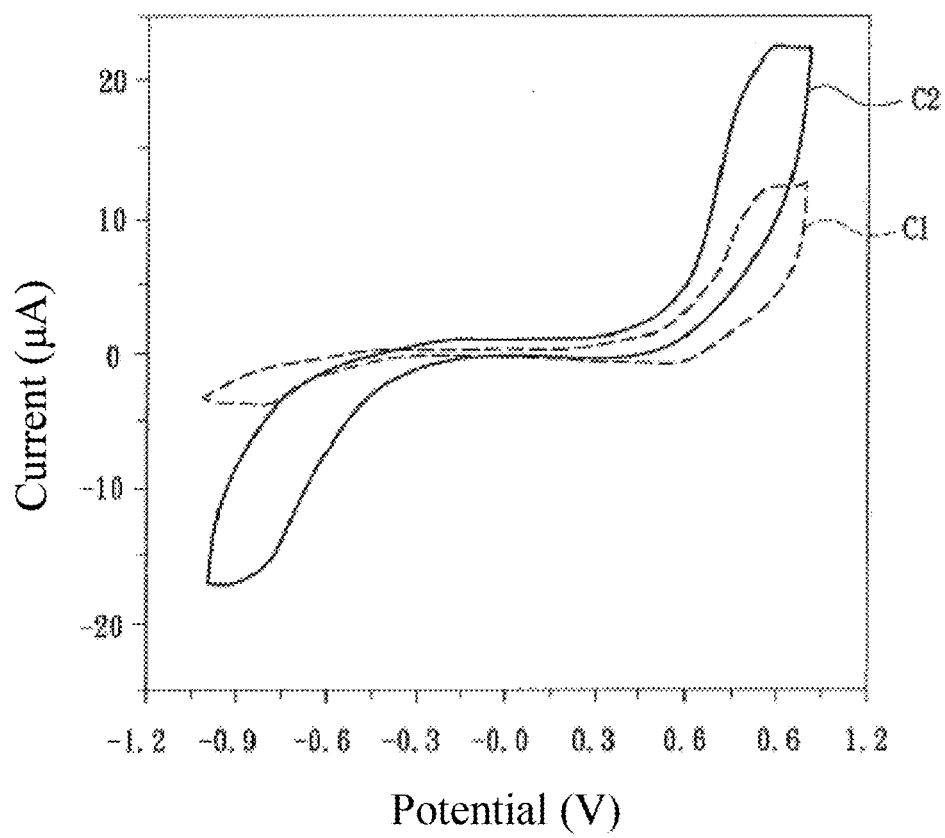
FIG. 15 is the sensitivity diagram from comparison between an electrode manufactured by a cobalt chromium oxide calcinate and the electrode manufactured by conventional $Co_3O_4$ through the measurement of cyclic voltammetry test in accordance with the second preferred embodiment of the present invention.

In the Chemical Formula 2, the X is ranging from 0 to 1.5. FIG. 13 is the X-ray powder diffraction analysis of the cobalt chromium oxide calcined for 1 hour under a temperature of 500 degrees Celsius, and FIG. 14 is the X-ray powder diffraction analysis of the cobalt chromium oxide calcined for 24 hours under the temperature of 500 degrees Celsius. The results of FIGS. 13 and 14 both indicate the cobalt chromium oxide is converted into the cobalt chromium oxide calcinate after verification by comparing with crystal databank. Preferably, when the cobalt chromium oxide is calcined for 6 hours at the temperature of 500 degrees Celsius, the cobalt chromium oxide is converted into the cobalt chromium oxide calcinate. Therefore, after calcination, the cobalt chromium oxide can be used in electrode of biosensor as well, just like cobalt manganese oxide calcinate in the first embodiment. With reference to FIG. 15, this figure is the intensity of reduction current from comparison between different electrodes under existence of 1 mM of hydrogen peroxide through cyclic voltammetry test, wherein C1 is conventional electrode modified by $Co_3O_4$, and C2 is the electrode modified by the cobalt chromium oxide calcinate. The results indicate that the intensity of reduction current of hydrogen peroxide from the electrode (C2) modified by the cobalt chromium oxide calcinate increases substantially comparing with C1. The cobalt chromium oxide calcinate also possesses the characteristic of high conductivity as well.

In a third embodiment of the present invention, a metal material contained with cerium is utilized as the first metal material. Comparing with the first embodiment, $Co^{2+}$ being contained in $CoSO_4.7H_2O$ is replaced by $Ce^{3+}$ of $Ce(NO_3)_3$. After redox reaction, a cerium manganese oxide is generated. Please refer to chemical equation 2 as followed:

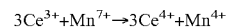

Next, the cerium manganese oxide is calcined and converted into a cerium manganese oxide calcinate, wherein the cerium manganese oxide calcinate compound represented by the following Chemical Formula 3:

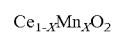  [Chemical Formula 3]

Figure 16:
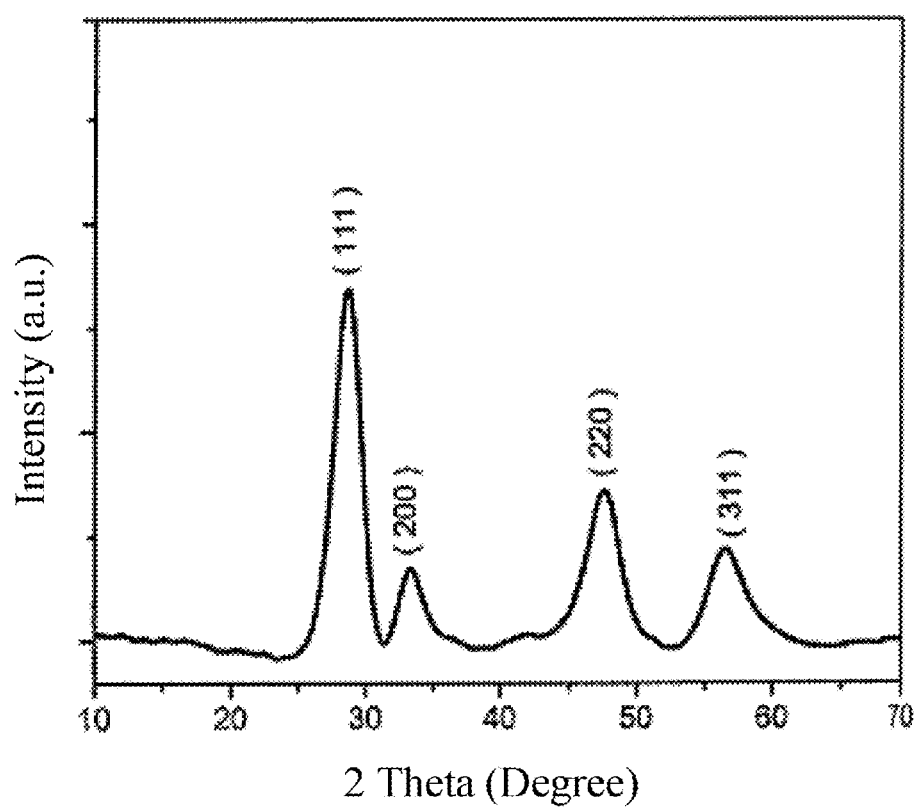
FIG. 16 is the X-ray powder diffraction of cerium manganese oxide calcinate in accordance with the third preferred embodiment of the present invention.

In the Chemical Formula 3, the X is ranging from 0 to 0.5. The cerium manganese oxide calcinate is analyzed by X-ray powder diffraction analysis as illustrated in FIG. 16. It is verified that the cerium manganese oxide is converted into the cerium manganese oxide calcinate by comparing with crystal databank, and the cerium manganese oxide is in a cerium oxide phase. In this embodiment, the valence difference between the first metal material and the second metal material ranges between 1 to 7. Adjusting the pH value ranged between 0 to 7, mixing the first metal material and the second metal material to perform redox reaction for obtaining a metal oxide material, and calcining the metal oxide material for obtaining a nanostructured metal oxide calcinate.

The primary features of the method for manufacturing the nanostructured metal oxide calcinate include: using phase process generated between two valence-differed metal materials, generating structural substitution phenomenon via redox reaction, and generating conversion of crystal phase via calcining to eventually obtain nanostructured metal oxide calcinate that is free of impurities. Accordingly, the method for manufacturing the nanostructured metal oxide calcinate of the present invention is suitable for multi metal species and enables to generate the nanostructured metal oxide calcinate that is free of impurities. Besides, the nanostructured metal oxide calcinate produced by the method of the present invention also possesses the characteristics with higher catalyzed activity and conductivity by the unique nanostructures of the nanostructured metal oxide calcinate. Furthermore, the costs of the method for manufacturing the nanostructured metal oxide calcinate is effectively decreased. Besides, this invention utilizes the nanostructured metal oxide calcinate to replace noble metal for use in electrode of conventional biological sensor so as to save the costs from purchasing noble metal. The sensitivity of $H_2O_2$ is effectively raised via high catalyzed activity and conductivity of the nanostructured metal oxide calcinate.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A method for manufacturing a nanostructured metal oxide calcinate includes:
    disposing a first metal material and a second metal material into a reaction slot to make the first metal material and the second metal material dissolved within a solvent to form a mixture, wherein a valence difference between the first metal material and the second metal material ranges between 1 to 7, the first metal material is in a metal state or in an oxidation state of metal that is not in a highest oxidation state, the second metal material is in an oxidation state of metal that is not in a metal state, a pH value of the mixture ranges between 0 to 7, the mixture performs a redox reaction to generate a metal oxide material, wherein the redox reaction is performed at a temperature between 60 to 150 degrees Celsius and a pressure between 19.95 to 198.6 kPa; and
    calcining the metal oxide material for obtaining a nanostructured metal oxide calcinate.

2. The method for manufacturing a nanostructured metal oxide calcinate in accordance with claim 1, wherein the period for performing the redox reaction is in the range between 0.5 to 24 hours.

3. The method for manufacturing a nanostructured metal oxide calcinate in accordance with claim 1, wherein the calcination period of the metal oxide material is in the range between 1 hour to 24 hours.

4. The method for manufacturing a nanostructured metal oxide calcinate in accordance with claim 1, wherein the calcination period of the metal oxide material is 6 hours.

5. The method for manufacturing a nanostructured metal oxide calcinate in accordance with claim 1, wherein the metal oxide material is calcined at a temperature between 260 to 900 degrees Celsius.

6. The method for manufacturing a nanostructured metal oxide calcinate in accordance with claim 1, wherein the metal oxide material is calcined at a temperature of 500 degrees Celsius.

7. The method for manufacturing a nanostructured metal oxide calcinate in accordance with claim 1, wherein the solvent is water.

8. The method for manufacturing a nanostructured metal oxide calcinate in accordance with claim 1, wherein the first metal material is Cobalt (II), and the second metal material is Manganese (VII).

9. The method for manufacturing a nanostructured metal oxide calcinate in accordance with claim 8, wherein the nanostructured metal oxide calcinate compound represented by the following Chemical Formula 1:

$$Co_{3-X}Mn_XO_4 \qquad \text{[Chemical Formula 1]}$$

wherein, in the Chemical Formula 1, the X is ranging from 0 to 1.5.

10. The method for manufacturing a nanostructured metal oxide calcinate in accordance with claim 1, wherein the first metal material is Cobalt (II), and the second metal material is Chromium (VI).

11. The method for manufacturing a nanostructured metal oxide calcinate in accordance with claim 10, wherein the nanostructured metal oxide calcinate compound represented by the following Chemical Formula 2:

$$Co_{3-X}Cr_XO_4 \qquad \text{[Chemical Formula 2]}$$

wherein, in the Chemical Formula 2, the X is ranging from 0 to 1.5.

12. The method for manufacturing a nanostructured metal oxide calcinate in accordance with claim 1, wherein the first metal material is Cerium (III), and the second metal material is Manganese (VII).

13. The method for manufacturing a nanostructured metal oxide calcinate in accordance with claim 12, wherein the nanostructured metal oxide calcinate compound represented by the following Chemical Formula 3:

$$Ce_{1-X}Mn_XO_2 \qquad \text{[Chemical Formula 3]}$$

wherein, in the Chemical Formula 3, the X is ranging from 0 to 0.5.

14. A method for manufacturing a nanostructured metal oxide calcinate includes:
    disposing a first metal material and a second metal material into a reaction slot to make the first metal material and the second metal material dissolved within a solvent to form a mixture, wherein a valence difference between the first metal material and the second metal material ranges between 1 to 7, the first metal material is in a metal state or in an oxidation state of metal that is not in a highest oxidation state, the second metal material is in an oxidation state of metal that is not in a metal state, a pH value of the mixture ranges between 0 to 7, the mixture performs a redox reaction to generate a metal oxide material, wherein the redox reaction is performed at a temperature of 100 degrees Celsius and a pressure of 101.4 kPa; and
    calcining the metal oxide material for obtaining a nanostructured metal oxide calcinate.

* * * * *